Aug. 6, 1946.　　　　M. SKOLNIK　　　　2,405,527
LAMINATED MATERIAL AND METHOD OF MAKING SAME

Filed Nov. 6, 1942

INVENTOR
Max Skolnik
BY Evans + McCoy
ATTORNEYS

Patented Aug. 6, 1946

2,405,527

UNITED STATES PATENT OFFICE 2,405,527

LAMINATED MATERIAL AND METHOD OF MAKING SAME

Max Skolnik, Chicago, Ill., assignor to Fibro-Mold Specialties, Inc., Chicago, Ill., a corporation of Illinois Application November 6, 1942, Serial No. 464,709

8 Claims. (Cl. 154—28)

This invention relates to a building material and to a method of making the same. It particularly relates to a panel or sheetlike building material which is strong, fire-resistant, and has good heat-insulating properties.

It is an object of the present invention to produce a strong, rigid, fire-resistant and moisture-resistant building material from relatively inexpensive, readily available raw material.

It is another object to provide a relatively flat, rigid, panel-like building unit that has high strength, is resistant to weather, heat and fire, and which has good heat insulating properties.

It is another object to provide a method of making building units which are weather, heat and fire-resistant and which have substantial structural strength from readily available, inexpensive raw materials.

It is a further object to provide heat-insulating panels suitable for constructing walls, partitions and the like, which panels are fire-resistant and are composed of readily available raw materials.

It is a still further object to provide a sheetlike or panel-like building material having a plurality of air spaces, such as are present in corrugated paper, and which is moisture-resistant, heat-resistant and has substantial strength.

Other objects will be apparent from the following detailed description of the invention, as illustrated by the accompanying drawing, in which.

Figure 1:
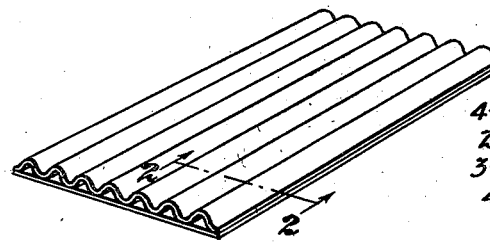
Figure 1 is a perspective view of a unit consisting of a sheet of corrugated fibrous material with a moisture-resistant coating and a superimposed fire-resistant stiffening coating, prepared in accordance with the steps of the present invention for constructing my composite stock material.
Figure 2:
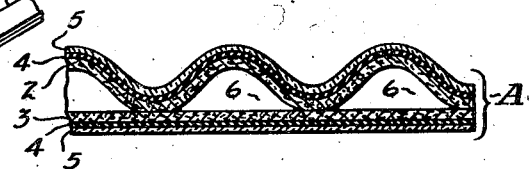
Fig. 2 is an enlarged cross sectional view, taken on the line 2—2 of Fig. 1.
Figure 3:
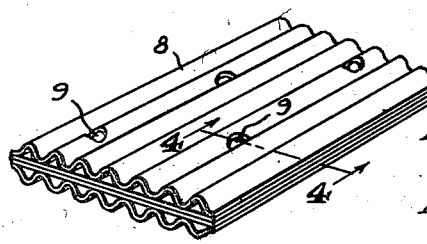
Fig. 3 is a perspective view of a composite interior portion of a stock material or panel embodying the present invention, showing two sheets of the material of Fig. 1 united in a composite structure in accordance with a further step of the preferred process of the present invention.
Figure 4:
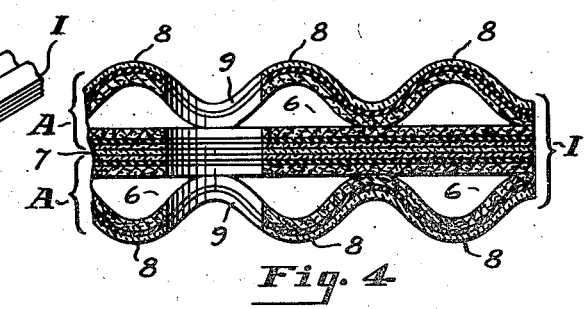
Fig. 4 is an enlarged sectional view, taken on the line 4—4 of Fig. 3.
Figure 5:
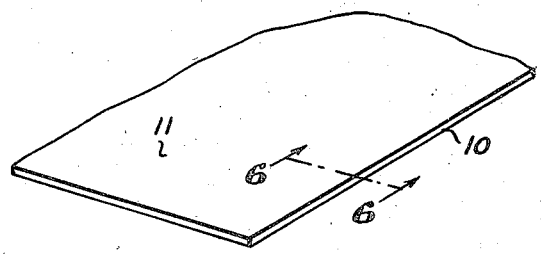
Fig. 5 is a perspective view of an outer sheet or element of a composite stock material embodying the present invention.
Figure 6:
Fig. 6 is an enlarged sectional view, taken on the line 6—6 of Fig. 5.
Figure 7:
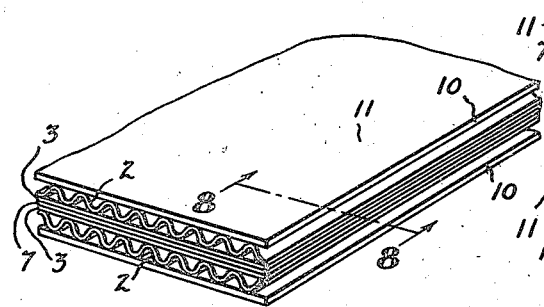
Fig. 7 is a perspective view of a portion of the composite unitary building unit or panel embodying the present invention.
Figure 8:
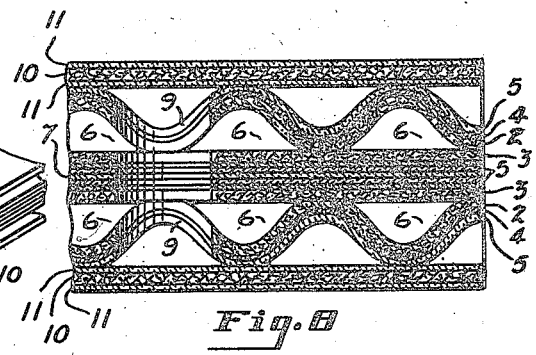
Fig. 8 is an enlarged sectional view, taken on the line 8—8 of Fig. 7.

Referring more particularly to the drawing, wherein like parts are indicated by like numerals of reference throughout the several views, the composite stock materials or building units of the present invention comprise an interior portion I, composed of a plurality of units A. Each unit A contains a sheet of corrugated fibrous material, e. g. corrugated paper, having a corrugated web 2, with or without, but preferably with, one relatively flat facing adhesively attached on one side only of said corrugated web 2. The corrugated fibrous web and the facing each has over the outer or exposed side thereof a coating or layer 4 of waterproofing material, which is preferably a meltable bitumen such as a tar, pitch or asphalt. Superimposed on the coating 4 of waterproofing material is an adherent layer of a hardened cement composition 5, which serves to both stiffen and fireproof the waterproofing material and the fibrous material. When the corrugated material has a facing, as is the case with paper that is corrugated on one side only, the web 2 and the facing 3 are waterproofed and fireproofed on one side only, it being found that due to penetration of the waterproofing material and the relatively small voids or air spaces 6 between the web and the facing, both fireproofing and moistureproofing are sufficient for commercial usage.

The plurality of units A are rigidly bonded together to form the interior portion I of the desired thickness, having corrugated webs as outer portions. Although I have shown in the drawing an interior portion I consisting of only two units having corrugated web (facing on one side only), in which case the units are preferably united together, with the relatively flat facings back-to-back, through a layer 7 of hardened cementitious material, it is obvious that when more than two units A are used to build up greater thickness, the facing of each additional unit may be cemented to corrugated webs of one of the outer units A to build up any desired thickness. The attachment of the addition units should be through magnesium cement applied only in the region of crests 8.

In order to increase the strength of the bond between the units of the material, it is preferred that a plurality of openings 9 be formed throughout the entire interior portion substantially perpendicular to the facing of the corrugated sheet material. The openings 9 permit flow of plastic cementitious material into contact with various layers or elements of the composite structural material and thus increase the strength of the composite material.

Adhered to at least one and preferably to both of the outer surfaces of the interior portion I, only in the region of the crests 8 of the outer webs, is a relatively flat facing or sheet 10 of roofing paper or other fibrous material which has preferably been treated throughout, or at least coated with a meltable waterproofing material, such as a bitumen, including asphalts, tars, pitches and the like, and which has superimposed coatings 11 of adherent, hardened stonelike cement composition on at least one and preferably on each of the flat surfaces thereof.

In the preparation of the stock material or panels of the present invention, the corrugated fibrous material, e. g. corrugated paper faced on one side only and having a web portion 2 and a relatively flat facing 3, is thinly coated, preferably by spraying or brushing with liquid asphaltic or bituminous compositions, which may either be in a molten condition or in solution in a suitable volatile solvent, such as gasoline, mineral spirits, etc. Magnesium oxychloride cement composition, which may be prepared by mixing about 20 or 25 Baumé magnesium chloride solution with sufficient magnesium oxide to form a thin creamy paste, is then sprayed or painted over the outer surfaces of the web and facing of the corrugated material. The coating thus formed usually has an average thickness of about one-sixteenth inch or so and dries or sets to a hard, stonelike coating with substantial stiffening effect.

Magnesium oxychloride cement compositions are especially desirable for the reason that these materials undergo a highly exothermic reaction during the setting or drying period. The temperature reached is often sufficient to cause softening of the surface of the asphalt, with the result that a much stronger bond is produced than is possible with other aqueous cementitious materials of which applicant is aware. The magnesium oxychloride cement may contain a small amount of wax, bitumen or other waterproofing material which may be mixed directly into the paste, either in the form of an emulsion or in combination with sawdust, powders or the like.

Outer surface portions of the composite structural material may be prepared by spraying or coating one or both surfaces of roofing paper with a thin creamy or pastelike magnesium oxychloride cement composition. The thin cement composition is preferably rubbed strongly in contact with the roofing paper in order to form more intimate bond with the waterproofing material thereof.

In the assembly of the composite panel-like building material, the flat surfaces of the coated facings of two sections are placed back-to-back in contact with the plastic layer 7 of magnesium oxychloride cement, which when dried or set strongly bonds to the coating 5 on each section and adheres the units A together. The thickness of the composite article may be built up to any desired value by simply superimposing sections A having a plastic magnesium oxychloride cement coating over the flat surfaces of the facings thereof and allowing the coating to harden. The outer covering elements or surface layers 10 are coated with a similar layer of plastic magnesium oxychloride cement and the plastic portions are pressed against the exposed corrugated webs of the interior portion I so that bonding is effected after the material has set in the region of the crests 8 of the corrugations.

The composite articles formed in accordance with the present invention have substantial structural strength. Because of the penetration of waterproofing material through the fibers of the fibrous material, the composite structures are relatively water-resistant. The magnesium oxychloride cement coating serves both as a major stiffening element of the structure and also as a fireproofing and bonding material adhering the elements of the composite unit together.

Although several embodiments of the invention have been herein shown and described, it will be understood that numerous modifications of the construction shown may be resorted to without departing from the spirit of this invention as defined in the appended claims.

What I claim is:

1. A rigid structural material comprising a plurality of corrugated fibrous webs, each of which has over a major portion of an outer surface thereof a coating of a meltable, flowable bituminous composition and directly superimposed thereon an adherent layer of a hardened, stonelike cement composition, a relatively flat facing sheet of fibrous material having at least one side coated with a waterproofing material and a directly superimposed adherent coating of hardened cement composition, said facing being disposed between successive corrugated webs and bonded to said corrugated webs so that adjacent corrugated webs are bonded together through at least one of said facings, whereby there is obtained a rigid structural material having a plurality of insulating air spaces.

2. A panellike stock material comprising a plurality of units adhered together through a magnesium cement composition, each of said units consisting of corrugated fibrous material comprising a web adhered on only one unwaterproofed side in the region of the apices of the corrugations to a relatively flat and smooth facing sheet, each of said units being coated on both sides with an adherent coating of bituminous waterproofing material, and superimposed directly thereon an adherent layer of hardened magnesium oxychloride cement composition.

3. A rigid, moisture and fire-resistant, composite insulating material comprising an interior portion containing two sheets of a corrugated paper having a corrugated web and a facing on one side only thereof, said facings being adhered together through a hardened magnesium cement composition, and an outer smooth sheet portion of bitumen-impregnated fibrous material adhered to at least one of the corrugated outer webs of said interior portion through a layer of magnesium cement composition, each of said sheets of corrugated paper having on each side thereof a coating of bituminous material in contact with the fibers and an adherent, directly superimposed coating of magnesium cement composition, said outer sheet also having on at least one side thereof an adherent coating of magnesium cement composition, said coatings on said corrugated fibrous material being insufficient to fill the spaces between the corrugations, whereby insulating air spaces remain throughout said composite material.

4. A rigid, moisture and fire-resistant, laminated composite insulating material, comprising an interior portion of at least two sections adhered together through a coating of magnesium cement composition, adhered to said interior portion at an outer corrugated web thereof an outer covering sheet of fibrous material impregnated with a bitumen and having in adhesive contact therewith, on at least one side, a coating of hardened magnesium oxychloride cement, each of said sections having a sheet of a corrugated fibrous material comprising a corrugated web and a facing sheet on one side of said web, one side only of said web and one side only of the facing being coated with a bituminous waterproofing material and a directly superimposed adherent layer of magnesium cement composition, the facings of said sections being joined together through a hard cement composition and the outer corrugated surface of said web being joined to said outer covering sheet through a hardened cementitious composition.

5. In a method of preparing a rigid, moisture and fire-resistant, composite building material, the steps which comprise coating with a waterproofing asphalt composition both sides of a plurality of sheets of corrugated paper comprising a corrugated web and a facing sheet on one side of said web, superimposing on the asphalt coating an unhardened magnesium cement composition, placing said sheets of the coated corrugated material in adhesive contact through a layer of plastic magnesium oxychloride cement, with a facing separating the corrugated webs of adjacent sheets, allowing the magnesium cement composition to harden to form an interior portion with at least one corrugated web exposed, rubbing a bitumen-impregnated fibrous sheet material with a magnesium oxychloride cement paste to cause intermingling of said paste with bitumen of said sheet in the region of the surface of said sheet, and placing the thus coated fibrous sheet against said exposed corrugated web of said interior portion with plastic magnesium oxychloride cement between said coated fibrous material and said corrugated web, and allowing the magnesium oxychloride cement paste to harden, whereby a strongly bonded composite building material having a plurality of air spaces to enhance insulating properties is obtained.

6. In a method of preparing a rigid, moisture and fire-resistant, composite building material, the steps which comprise coating with a waterproofing asphalt composition both sides of a plurality of sheets of corrugated paper, each of which sheet comprises a web and on one side thereof a facing sheet, superimposing on the asphalt coating an unhardened magnesium cement composition, placing said sheets of the coated corrugated material in adhesive contact through a layer of plastic magnesium oxychloride cement, with a facing separating the corrugated webs of adjacent sheets, allowing the magnesium cement composition to harden to form an interior portion with at least one corrugated web exposed, rubbing a bituminous impregnated facing sheet of fibrous material with a magnesium oxychloride cement paste to provide a coating thereon and to provide intermingling of portions of said asphalt and said paste so that upon hardening of said paste adhesion is had through said asphalt to said sheet, and placing the thus coated facing sheet against one of said exposed corrugated webs of said interior portion with plastic magnesium oxychloride cement between said coated facing sheet and said corrugated web, and allowing the magnesium oxychloride cement of said coating to harden, whereby a strongly bonded composite building material having a plurality of air spaces to enhance insulating properties is obtained.

7. In a method of preparing a rigid, moisture and fire-resistant, composite structural building material, the steps which comprise coating with a waterproofing bituminous composition both sides of a sheet of corrugated paper, which sheet comprises a web portion and a facing sheet on one side of said web portion, superimposing directly on said bituminous composition an unhardened magnesium oxychloride cement paste, rubbing a relatively flat, bitumen-impregnated sheet of fibrous material with a magnesium oxychloride cement paste to provide adhesive contact between said bitumen-impregnated fibrous material and said magnesium oxychloride cement and to provide intermingling of portions of said bituminous composition and said paste so that upon hardening of said paste adhesion is had through said bituminous composition to said sheet, placing the thus coated impregnated sheet against a corrugated surface of said corrugated fibrous material, and allowing said magnesium oxychloride cement paste to harden to produce a strongly bonded rigid building material having a plurality of air spaces to enhance insulating properties thereof.

8. In a method of preparing a rigid moisture and fire-resistant, composite building material, the steps which comprise coating with a waterproofing asphalt composition both sides of a sheet of corrugated paper, consisting of a corrugated web and a facing sheet secured together with the crests of the corrugation secured to one surface of the facing sheet, superimposing on the asphalt coating an unhardened magnesium cement composition, adhering a plurality of such coated corrugated web and facing sheets together through a layer of magnesium oxychloride cement, rubbing a sheet of fibrous material treated with bitumen with a magnesium cement paste to provide a coating thereon and to provide intermingling of portions of said bitumen and said paste so that upon hardening of said paste adhesion is had through said bitumen to said sheet, applying the thus coated sheet to the crest portions of one of said corrugated webs, and allowing said paste to harden, whereby said web becomes bonded to said sheet through said magnesium cement.

MAX SKOLNIK.